9491X
A. Conant,
Latch.
Patented Mar. 12, 1836.
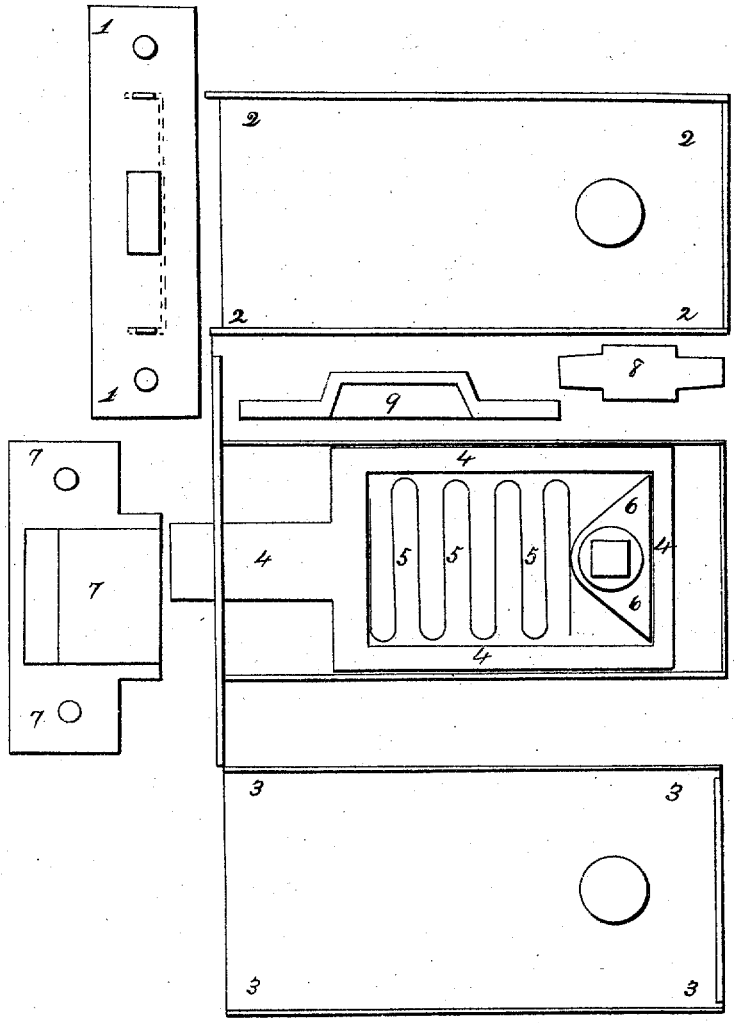
AM. PHOTO-LITHO. CO. N.Y. (OSBORNE'S PROCESS)

March 12, 1836

Abel Conant of Lowell Massachusetts
Letters Patent

The Schedule referred to in these Letters Patent and making part of the same containing a description in the words of the said Abel Conant himself of his improvement in the cheap lock and other mortise door or drawer fastening.

To all to whom these Presents shall come Be it Known that I Abel Conant of Lowell, in the County of Middlesex and Commonwealth of Massachusetts, Esquire, have invented a new and useful mode or manner of constructing a cheap lock or other mortise door or drawer fastening, and that the following is a full and exact description of the construction operation and use of the same as invented by me.

The case for this lock or other fastening, is constructed of sheet iron, brass, copper, tin or other metal, the thickness thereof depending on the size of the lock or fastening., and consists of three pieces. That which I call No 1, (see drawing and when the lock or fastening is sunk in its mortise is seen on the edge of the door or drawer, is that through which the bolt or latch passes, and also has two smaller mortises made in their proper places, through which the tenons on the end of the plate No 2 passes, it also has two round holes through it, to secure the lock or fastening in its mortise by means of screws or nails. That plate I call No 2 (see drawing the size of which when finished determines the size of the lock or fastening is turned at the sides, and one end at right angles, as high as the thickness of the bolt or latch intended to be placed in the same, On the turned up sides at the unturned end are two tenons which pass into the small mortises in No 1. and are fastened thereto, thus forming what I call the box or bed of the case, in which are placed the movements and fixtures of the lock or fastening.

That which I call No 3. see drawing) forms a cover to the box or bed, and with the exception of tenons on the turned up sides at the unturned end is of the shape or form of No 2. only of a proper size to shut over the sides and within at the turned up end of the same (which mode is preferred although it may . . shut within on all sides) thereby holding said No 3. in contract with plate No 1. by which means said cover is firmly held to the box or bed by its elasticity. also through said plates Nos 2 & 3. are large holes made in their places near the end opposite plate No 1. through which pass the bosses or journals of the dog or tumbler. The bolt see No 4. drawing) except that part which passes through plate No 1. in most of its length is in the form of a hollow rectangular parallelogram, within the hollow of which are placed the dog ~~and~~ tumbler and spring. The spring see No 5. drawing is zig-zag or serpentine in form and is made of thin metal with a sufficient number of turnings therein to extend from the dog or tumbler to the forward end of the hollow of the bolt against which it takes its bearings. No 6. I call the dog or tumbler see drawing) through which is a square mortice in which is placed the shaft or arbor upon which I affix as my invention cast or wrought iron knobs. or handles as well as the kinds now in general use. By a partial revolution of this dog or tumbler the bolt is drawn back with great ease. It is also so situated within the hollow of the bolt as to prevent the spring ~~from~~ acting upon the forward end of the hollow part forcing the bolt through plate No 1. further than is necessary. The catch see No 7 in the drawing on which the end of the bolt strikes when closing the door or drawer is formed with an inclined plane by which one half or more of the inclined plane is taken from the bolt, by reason of which the lock or fastening may be as much less in thickness. In the annexed drawing No 8 is a profile view of the dog or tumbler, and No 9. a profile of the catch. The parts which I claim as my invention are to wit, 1st. The cheap construction of the sheet metal Box or case which may be used for any mortise fastening. The cover thereof being attached with sufficient firmness by its elasticity without the aid of rivets or screws. 2nd. The transferring of a large share of the inclined plane plane from the bolt to the catch whereby the bolt may be made but half
or less of the usual thickness. and thus reducing the thickness of
the fastening and consequently diminishing the cutting of the door.
3d The application of the zig zag or serpentine spring within the
hollow of the bolt, thereby giving a much greater length to the spring
than could otherwise be had, by which its elasticity and usefulness
are much increased. 4th the use of cast or wrought Iron knobs
or handles for mortise fastenings in place of glass ~~wood~~, brass or
other metal. in consequence of which the expense of the fastening is
greatly reduced.

Witnesses
Chas. C. Thompson
Geo: Woodward

Abel Conant

Recd [illegible]

(961 words) (Patented March 17. 1836.)

Drawing